Nov. 21, 1967    R. W. ANTHONY    3,353,391
METHOD AND APPARATUS FOR CORRECTING OVALITY OF ANNULAR GEARS
Filed June 21, 1965    2 Sheets-Sheet 1
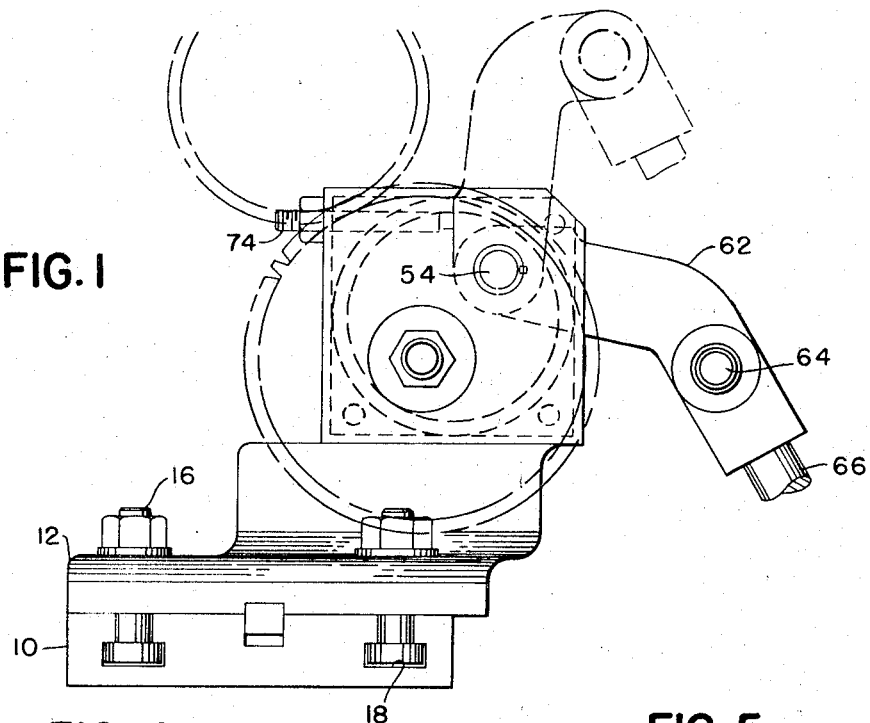
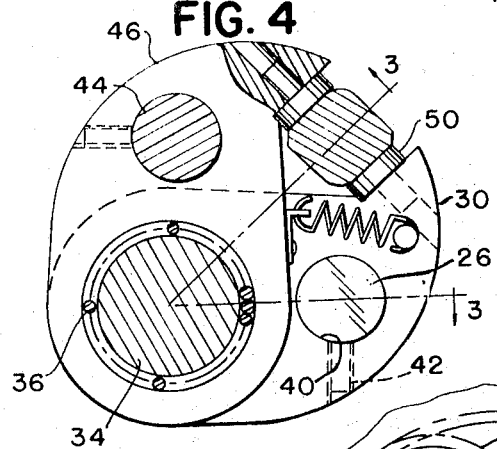
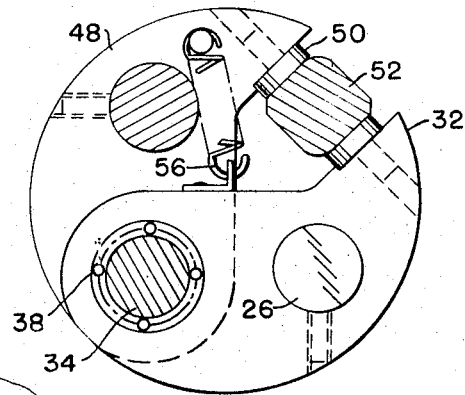
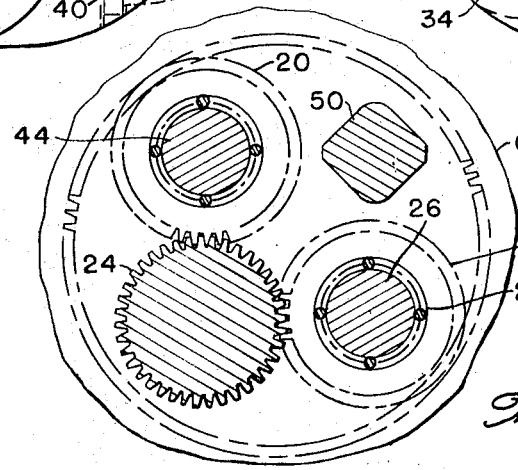
INVENTOR.
RUSSEL W. ANTHONY
ATTORNEYS

INVENTOR.
RUSSEL W. ANTHONY
ATTORNEYS

United States Patent Office 3,353,391
Patented Nov. 21, 1967

3,353,391
METHOD AND APPARATUS FOR CORRECTING OVALITY OF ANNULAR GEARS
Russel W. Anthony, Detroit, Mich., assignor to National Broach & Machine Company, Detroit, Mich., a corporation of Michigan
Filed June 21, 1965, Ser. No. 465,486
10 Claims. (Cl. 72—110)

ABSTRACT OF THE DISCLOSURE

A method and apparatus for reducing nicks and burrs and for correcting ovality in heat treated internal gears by moving a pair of hardened pinions in mesh at diametrically opposite points with the gear apart to apply sufficient pressure to distort the internal gear beyond its elastic limit, rotating the gear and pinions for at least a full rotation of the work gear, and thereafter moving the pinions gradually together during continued rotation of the work gear.

---

It is an object of the present invention to provide a novel method and apparatus for correcting out-of-round condition or ovality of annular gears, while at the same time burnishing the teeth and eliminating or reducing nicks and burrs thereon.

It is a further object of the present invention to provide a method and apparatus for correcting the ovality of an annular gear operable to apply substantially radially oppositely directed forces at circumferentially spaced points of a magnitude to stress the annular gear beyond its elastic limit, rotating the gear so that the points of application of radial forces migrate circumferentially of the gear, and reducing the magnitude of the forces to within the elastic limit of the annular gear.

It is a further object of the present invention to provide a method and apparatus as described in the preceding paragraph in which the forces are applied to the inner surfaces of the annular gear and are directed radially outwardly.

More specifically, it is an object of the present invention to provide a method and apparatus as described in the preceding paragraph in which the points of application of outward force to the annular gear are substantially 180 degrees apart with reference to the gear.

It is a further object of the present invention to provide a method and apparatus as described in the preceding two paragraphs in which the radially outwardly directed forces are applied to the teeth of the internal or annular gear by means of a pair of pinions rotating in mesh therewith whereby the pinions will burnish the teeth of the gear and will eliminate or substantially reduce any nicks or burrs thereon.

It is a further object of the present invention to provide a method and apparatus as described in the foregoing in which the rate of reduction of the radially directed forces applied to the annular gear is related to the speed of rotation thereof so that the gear makes a plurality of rotations during the reduction of force to a value within the elastic limit of the annular gear.

Other objects and features of the invention will become apparent as the description proceeds, especially when taken in conjunction with the accompanying drawings, illustrating a preferred embodiment of the invention, wherein:

FIGURE 1 is a side elevational view of the apparatus for correcting ovality.

Figure 2:
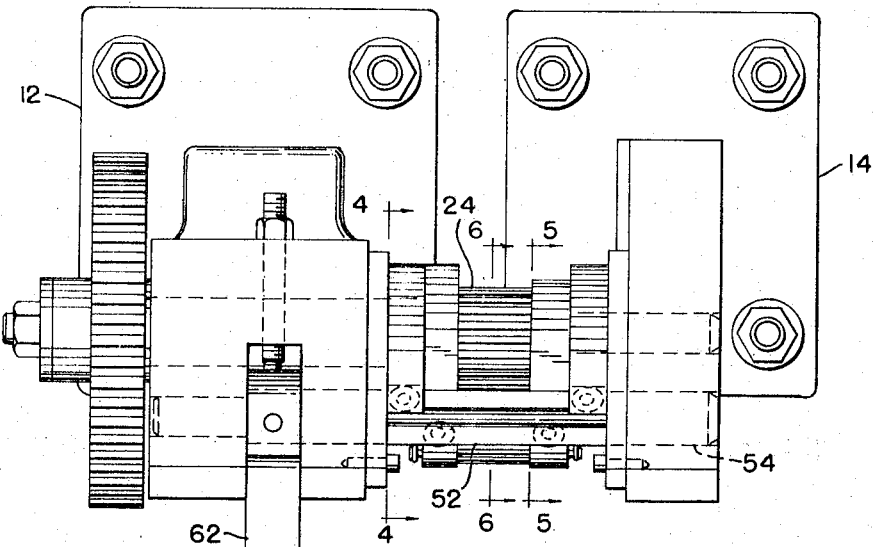
FIGURE 2 is a plan view of the apparatus seen in FIGURE 1.

FIGURES 4, 5 and 6 are fragmentary sectional views on the lines 4—4, 5—5, and 6—6, respectively, FIGURE 2.

The present invention relates to a method and apparatus useful in final treatment of ring gears after a final heat treat operation. It has been found that ring gears after the final heat treat operation commonly are distorted so that the pitch line of the teeth at the interior thereof does not occupy a true circle. This condition is generally referred to as ovality. At the present time, ovality of ring gears presents a very serious problem. In the first place, there is not available a completely satisfactory method of determining a condition of ovality of the pitch circle. It is desirable to correct ovality without reference to the outside diameter of the part because of the fact that the teeth are not ordinarily qualified with respect to the outside diameter.

In the past when a condition of ovality was found to exist its correction has been by the application of forces along the long axis of the part to exceed the elastic limit and so to provide a residual strain. It is generally impossible to determine the proper magnitude of force to exactly correct ovality, even assuming that ovality can be completely corrected by the application of force to two points along the long axis of the part.

In accordance with the present invention, the annular gear is subjected to a treatment without attempting to determine the magnitude of ovality or even whether ovality exists or not. This treatment consists in the application of radial forces, preferably radially outwardly acting forces, on the gear, preferably to its teeth at substantially diametrically oppositely located points, of a magnetude substantially in excess of the elastic limit of the gear, accompanied by relative rapid rotation of the gear and a gradual reduction in the magnitude of the forces until the forces pass below the elastic limit. It is found that with this treatment ovality of the ring gear may be reduced substantially below .001".

The amount of correction thus available makes it possible to maintain the tolerances of ring gears with regard to ovality at values representing only a fraction of the tolerances forced upon industry in the past by the lack of efficient means for correcting ovality. It has been common practice to accept internal gears having ovality of as much as .005".

The gears when subjected to a treatment for correcting ovality are ordinarily in the final condition following heat treatment. By employing hardened pinions in mesh with the internal gear at diametrically opposite points as the means for applying radially outward forces thereto, it is possible to obtain further advantages by the present method in that the hardened pinions operate under sufficient pressure to produce a burnishing of the teeth of the gear and also tend to eliminate nicks and burrs which may have been formed in the teeth thereof by mishandling during production.

Referring now to the drawings the apparatus comprises a bed 10 on which a pair of mounting bases 12 and 14 are connected as by bolts 16 extending into T-slots 18 formed in the bed 10. It may be mentioned at this time that the base 14 carries an end plate 19 constituting an outboard support for a plurality of shafts, later to be described, and may be omitted if the shafts are of adequate strength and are adequately supported by structure carried by the mounting base 12.

Referring first to FIGURE 6, an annular gear G having internal teeth is illustrated as in mesh simultaneously with pinions 20 and 22 which are provided with means for moving them radially outwardly from the axis of the gear G. The pinions 20 and 22 are in loose mesh with a driving pinion 24 which rotates the pinions 20 and 22 and hence effects rotation of the gear G. The pinion 22 is mounted on a shaft 26 by needle bearings 28. The ends of the shaft 26 are carried by a pair of arms 30 and 32 which are pivoted to shaft 34 by bearings respectively indicated at 36 and 38. The ends of the shaft 26 are secured in place in openings 40 in the arms by threaded set screws 42.

The pinion 20 is similarly mounted on a shaft 44 carried at its ends by arms 46 and 48. At the ends of the arms 30, 32, 46 and 48 opposite to their pivot mounting on the shaft 34 there are provided wear buttons 50 engageable with a camming section 52 of a shaft 54. As well illustrated in FIGURES 4 and 5, rotation of the camming section 52 through an angle of approximately 45 degrees in a counterclockwise direction as seen in these figures, will result in forcing the buttons 50 apart and correspondingly rocking the arms 30, 32, 46 and 48 in a direction to cause the pinions 20 and 22 to move substantially diametrically outwardly with respect to the annular gear G. The adjacent arms are interconnected by tension springs indicated at 56 which will retain the buttons 50 in contact with the camming section 52. The cam shaft 54 is mounted for rotation in an opening 58 in the mounting body 60 and has keyed or otherwise secured to it an operating arm 62, best seen in FIGURE 1. The operating arm 62 is connected by pivot means 64 to a piston rod 66 which in turn is connected to a piston (not shown) movable longitudinally in an actuating cylinder.

The pinion 24 is rigidly secured or formed integrally with the shaft 34 and is driven in rotation by a gear 68 splined thereto and in mesh with a gear 70 driven from a shaft 72 connected to a motor.

The outboard ends of the shafts 34 and 54 are supported for rotation in apertures or bearings in the end plate 19 as previously described. However, if the shafts, and particularly the shaft 34, are of adequate strength and are adequately supported the outboard support may be omitted. This is desirable because it facilitates loading and unloading of work gears G on the pinions 20 and 22.

Figure 3:
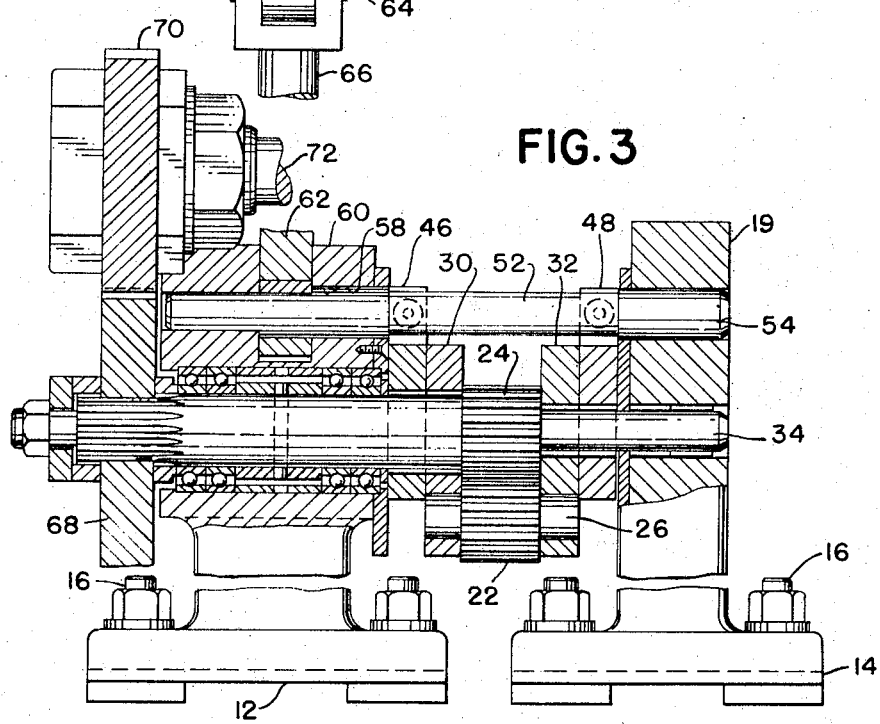
FIGURE 3 is a composite sectional view taken on the broken line 3—3, FIGURE 4.

Attention is particularly directed to the fact that FIGURE 3 is a sectional view taken on the discontinuous line 3—3, FIGURE 4 so that in this view the shafts 54, 34 and 26 all appear to be in the same plane. The actual relationship of these shafts is of course clearly illustrated in the sectional views of FIGURES 4–6.

In operation the cam shaft is rotated to a position in which the buttons 50 are at their closest approach and accordingly, the pinions 20 and 22 are moved radially inwardly into a position such that clearance will exist with respect to a work gear G loaded thereon, although the teeth of the pinion and work gear will be in loose mesh. It will be recalled that the operation is intended primarily for a final finishing operation on hardened annular gears. The pinion 24 is in loose mesh with the pinions 20 and 22. The backlash between the teeth of these pinions is such that the pinions 20 and 22 are rotationally positioned such that their teeth will enter into mesh with the proper tooth spaces in a work gear G.

Having mounted a work gear in loose mesh on the pinions 20 and 22, fluid under pressure is admitted to the cylinder in which the piston connected to the piston rod 66 is movable and the arm 62 is rotated to bring the high point on the camming section 52 between generally opposed buttons 50, thus swinging the arms 30, 32, 46 and 48 in the directions required to move the pinions 20 and 22 apart. Movement of the arm 62 is limited by the adjustable stop screw 74. The motor connected to the drive shaft 72 is energized driving the pinion 24 in rotation and this in turn results in rotation of the pinions 20 and 22 and also rotation of the gear G. The speed of rotation is substantial, as for example about 60 r.p.m., or at least between 30 and a few hundred r.p.m. The force applied by the camming section 52 to the internal gear may be relatively great, as for example in excess of 1000 pounds. The magnitude of this force will of course depend upon the dimensions and characteristics of the gear. However, in all cases the magnitude of this force is sufficient to impart a permanent set or strain to the gear if it were applied without rotation thereof. For example, excellent results have been obtained when a force was applied sufficient to produce an ovality in the gear after the force was removed of approximately .020" on a 4.5" gear.

While the gear continues to rotate at relatively high speed, the fluid pressure is gradually released from the cylinder permitting the arm 62 to returne gradually to its position illustrated in FIGURES 4–6, thus removing the radial force from the work gear.

The actual speed of rotation of the work gear and the rate at which the distorting force is released are not particularly critical so long as they are properly related to each other. However, in order that the operation may be performed in a minimum of time, it is desirable to rotate the gear at substantial speed, as for example about 60 r.p.m. It is an essential requirement that the gear continue to rotate and make at least one, and preferably a plurality of complete rotations as the forces applied to the gear are decreased gradually from the maximum to forces within the elastic limit of the gear.

As a specific example, ovality was corrected on a number of gears having a pitch diameter of about 4.5", a width of 1.3", and a wall thickness from the outside diameter to the bottom of a tooth space of about .25". These gears were stressed to reduce the pitch diameter on the minor axis by about .075" while rotating the gear relative to the zones of pressure application at about 60 r.p.m. After a few complete rotations, the distorting force was gradually reduced throughout about two complete revolutions. In different tests, initial ovality of about .0100" was reduced to .0015", and an ovality of about .008" was reduced to .002". In general, more initial ovality in the gear requires greater distortion of the gear to correct it.

The magnitude of the forces applied permits the pinions, which for this purpose are hardened and accurately formed, to perform a useful burnishing action and in addition, to remove nicks and burrs from the teeth of the gear.

The drawings and the foregoing specification constitute a description of the improved method and apparatus for correcting ovality of annular gears in such full, clear, concise and exact terms as to enable any person skilled in the art to practice the invention, the scope of which is indicated by the appended claims.

What I claim is:

1. The method of simultaneously correcting ovality and reducing nicks and burrs in a heat treated annular internal gear which comprises meshing the gear with a pair of hardened pinions spaced substantially diametrically with respect to the gear, applying radially outwardly directed forces to said pinions to stress the gear beyond its elastic limit, rotating the gear and pinions in mesh, and gradually reducing the forces to be below the elastic limit of the gear.

2. The method of claim 1 which comprises rotating the gear through a plurality of revolutions during diminution of the forces.

3. Apparatus for simultaneously correcting ovality and reducing nicks and burrs in a heat treated internal gear comprising a pair of hardened pinions, means mounting said pinions for movement toward and away from an imaginary axis, force applying means for urging said pinions for relative movement radially outwardly of said axis with a force substantially in excess of the elastic limit of an internal gear in mesh with said pinions to elongate said gear, means for driving said gear and pinions in rotation, and means for gradually reducing the magnitude of the force acting between said gear and pinions.

4. Apparatus as defined in claim 3 in which said pinions are hardened pinions conjugate to the teeth of the internal gear to burnish said gear and to reduce nicks and burrs on the teeth thereof.

5. Apparatus of the class described comprising a first shaft, means for rotating said shaft, a drive pinion on said shaft, two arms pivotally connected to said shaft, a pinion connected to each of said arms and in mesh with said drive pinion, said pinions adapted to mesh at substantially diametrically opposite points with an internal gear and to constitute the sole means of lateral support therefor, means connected to said arms for urging said arms apart to apply a radially outward force to an internal gear on said pair of pinions of a magnitude to distort the gear, and means for controlling and effecting a gradual reduction in such force.

6. Apparatus of the class described comprising a first shaft, means for rotating said shaft, a drive pinion on said shaft, two arms pivotally connected to said shaft, a pinion connected to each of said arms and in mesh with said drive pinion, said pinions adapted to mesh at substantially diametrically opposite points with an internal gear and to constitute the sole means of lateral support therefor, means interposed between said arms remote from said first shaft for urging said arms apart to apply a radially outward force to an internal gear on said pair of pinions of a magnitude to distort the gear, and means for controlling and effecting a gradual reduction in such force.

7. Apparatus as defined in claim 6, said drive pinion and said pinions being in sufficiently loose mesh as to provide for the relative movement therebetween without binding.

8. Apparatus of the class described comprising a first shaft, means for rotating said shaft, a drive pinion on said shaft, two pairs of arms pivotally connected to said shaft, a pair of pinions each connected to one of said pairs of arms and in mesh with said drive pinion, said pinions adapted to mesh at substantially diametrically opposite points with an internal gear and to constitute the sole means of lateral support therefor, rotary cam means interposed between said arms for urging said arms apart to apply a radially outward force to an internal gear on said pair of pinions of a magnitude to distort the gear, and means for controlling and effecting a gradual reduction in such force.

9. Apparatus as defined in claim 8 in which the means for controlling and effecting a gradual reduction of force comprises a piston and cylinder device connected to said cam means.

10. Apparatus of the class described comprising a frame, a drive shaft, a drive pinion thereon, two pairs of arms pivotally connected to said drive shaft, a mounting shaft connected between the arms of each pair, a pinion on each mounting shaft in loose mesh with said drive pinion, the ends of corresponding shafts of each pair being in proximity, a rotary cam shaft on said frame having cam portions interposed between the proximate arm ends operable to swing the pinions on said mounting shafts apart, means for driving said drive shaft in rotation, and means for turning said cam angularly about its axis to apply force through the pinions on said mounting arms to an internal gear on said pinions in excess of its elastic limit and to effect gradual reduction of such force by reversely turning said cam shaft while driving all of said pinions in continuous rotation.

References Cited

UNITED STATES PATENTS

| 199,482 | 1/1878 | Trethewey | 72—111 |
| 790,088 | 5/1905 | Thomas | 72—110 |
| 1,989,652 | 1/1935 | Drummond | 29—90 |
| 3,000,426 | 9/1961 | Ducker et al. | 72—110 |
| 3,096,669 | 7/1963 | Tremblay | 80—16.3 |

FOREIGN PATENTS 804,019   11/1958   Great Britain.

CHARLES W. LANHAM, *Primary Examiner.*

E. SUTTON, *Assistant Examiner.*